United States Patent
Steele et al.

(10) Patent No.: US 9,908,419 B2
(45) Date of Patent: Mar. 6, 2018

(54) METHOD AND APPARATUS FOR CONTROLLING A DC/DC POWER CONVERTER

(71) Applicant: GM GLOBAL TECHNOLOGY OPERATIONS LLC, Detroit, MI (US)

(72) Inventors: Russell K. Steele, Clinton Township, MI (US); James F Crawford, Macomb, MI (US); Alexander Bilinski, Avoca, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 302 days.

(21) Appl. No.: 14/950,066

(22) Filed: Nov. 24, 2015

(65) Prior Publication Data

US 2017/0144553 A1   May 25, 2017

(51) Int. Cl.
*B60L 11/18* (2006.01)
*H02M 3/04* (2006.01)

(52) U.S. Cl.
CPC .............. *B60L 11/18* (2013.01); *H02M 3/04* (2013.01)

(58) Field of Classification Search
None
See application file for complete search history.

(56) References Cited

U.S. PATENT DOCUMENTS

2013/0076129 A1* 3/2013 Kunimitsu .......... B60L 11/1859
  307/10.7
2014/0203634 A1* 7/2014 Sugiyama ................ B60L 1/00
  307/10.1

* cited by examiner

*Primary Examiner* — Jared Fureman
*Assistant Examiner* — Aqeel Bukhari
(74) *Attorney, Agent, or Firm* — Quinn IP Law (57) ABSTRACT

A vehicle including a high-voltage electric battery assembly including first and second battery cell modules and DC/DC electric power converter assembly is described. The DC/DC electric power converter assembly selectively converts electric power from the first battery cell module and the second battery cell module. A second end of the DC/DC electric power converter is electrically connected to a low-voltage system. The low-voltage system includes a first subsystem configured to provide a critical vehicle operation. A controller includes algorithmic code executable to monitor the high-voltage battery assembly, including, upon detecting a fault in the first battery cell module of the high-voltage battery assembly, controlling the DC/DC electric power converter assembly to electrically convert electric power from the second battery cell module to low-voltage electric power that is transferred to the first subsystem.

18 Claims, 5 Drawing Sheets

METHOD AND APPARATUS FOR CONTROLLING A DC/DC POWER CONVERTER

TECHNICAL FIELD

This disclosure relates to powertrain systems employing high-voltage electric power systems, and control routines related thereto.

BACKGROUND

Vehicles may employ powertrain systems that generate propulsion power from an internal combustion engine (engine) in conjunction with a non-combustion motor such as one or multiple high-voltage electric motor/generators. The high-voltage electric motor/generator(s) draw electric power from an on-vehicle high-voltage electric energy storage device, e.g., a high-voltage battery, via a high-voltage electric power circuit. The high-voltage battery may be charged during vehicle operation, and/or may be charged using electric power sourced from an off-vehicle electric source.

High-voltage batteries may support critical vehicle operations. There may be a need to supply electrical power to critical vehicle operations in the event of a fault in a cell of a high-voltage battery, including supplying electrical power to critical vehicle operations in vehicles that do not employ secondary low-voltage battery backup systems.

SUMMARY

A vehicle is described and includes a high-voltage electric battery assembly including a first battery cell module and a second battery cell module, wherein the first and second battery cell modules each include a plurality of electrically connected cells. A DC/DC electric power converter assembly includes a first end receiving electric power from the high-voltage electric battery assembly and a second end delivering low-voltage electric power at a regulated voltage level. The DC/DC electric power converter assembly is configured to selectively convert electric power from the first battery cell module and selectively convert electric power from the second battery cell module. The second end of the DC/DC electric power converter is electrically connected to a low-voltage system. The low-voltage system includes a first subsystem configured to provide a critical vehicle operation. A controller is in communication with the high-voltage electric battery assembly, the DC/DC converter, and the first subsystem. The controller includes algorithmic code executable to monitor the high-voltage battery assembly. Upon detecting a fault in the first battery cell module of the high-voltage battery assembly, the controller controls the DC/DC electric power converter assembly to electrically convert electric power from the second battery cell module to low-voltage electric power that is transferred to the first subsystem.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
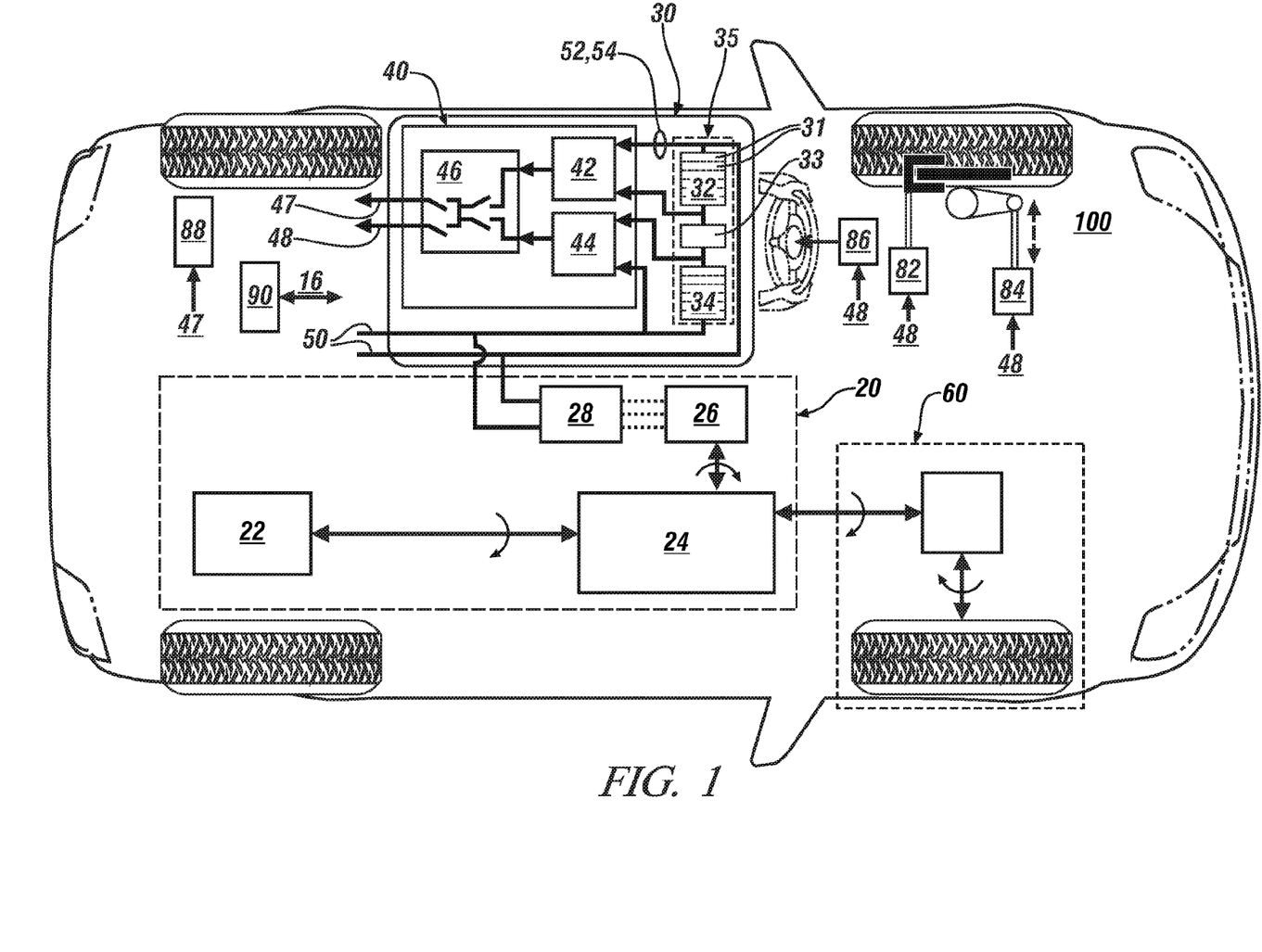
FIG. 1 schematically illustrates an embodiment of a vehicle including a powertrain system and a high-voltage electric power system, in accordance with the disclosure.

Referring now to the drawings, wherein the depictions are for the purpose of illustrating certain exemplary embodiments only and not for the purpose of limiting the same, FIG. 1 schematically illustrates an embodiment of a vehicle 100 including a powertrain system 20 and a high-voltage electric power system 30 that is controlled by a controller 90. The powertrain system 20 may include an internal combustion engine (engine) 22 and an electric machine 26 that mechanically couple to a geartrain 24 that mechanically couples to a vehicle driveline 60 to supply propulsion power to one or a plurality of vehicle wheels. Like numerals and like terms indicate like or corresponding elements throughout the several views. The vehicle 100 operates in response to operator commands and directions, including controlling vehicle and powertrain operation in response to operator commands that are conveyed through user interface devices that may include an accelerator pedal, a brake pedal, a transmission range selector, an ignition switch and/or other suitable devices.

The high-voltage electric power system 30 includes a high-voltage energy storage device (high-voltage battery) 35 and a low-voltage electric power system 40. The high-voltage battery 35 supplies high-voltage electric power via a high-voltage bus 50 to electric power components. The low-voltage electric power system 40 electrically connects to the high-voltage battery 35 and includes a first subsystem 42 and a second subsystem 44 that selectively supply electric power to a first low-voltage power conductor 48 and a second low-voltage power conductor 47 via a controllable switching circuit 46. The first subsystem 42 and the second subsystem 44 are configured to provide low-voltage electric power that may be supplied to a first low-voltage power conductor 48 and/or to the second low-voltage power conductor 47 via the controllable switching circuit 46, which preferably includes power transistors or other devices that may be controlled by the controller 90. The first subsystem 42 and the second subsystem 44 may electrically connect via the first low-voltage power conductor 48 to one or more low-voltage systems 82, 84, 86 associated with critical vehicle operation. By way of non-limiting examples the low-voltage systems 82, 84, 86 associated with critical vehicle operation may include an electric braking system 82, an electric power steering system 84 and a supplemental restraint system 86. The first subsystem 42 and the second subsystem 44 may electrically connect via the second low-voltage power conductor 47 to one or more low-voltage systems 88 associated with non-critical vehicle operations, including devices such as electric windows, HVAC fans, seats, and other accessory devices. The first subsystem 42 and the second subsystem 44 each include DC/DC converters that are preferably electronic circuits that convert direct current (DC) electric power from a higher voltage level to a lower, regulated voltage level. The first subsystem 42 and the second subsystem 44 are preferably configured as dual continuous use DC/DC converters, wherein electric power supplied to the first subsystem 42 and electric power supplied to the second subsystem 44 has the same electrical potential. The regulated voltage level output from both the first subsystem 42 and the second subsystem 44 is 14.4 V-DC in one embodiment, which is nominally referred to herein as a low-voltage system. The high-voltage bus 50 includes a nominally positive bus bar (HV+) and a nominally negative bus bar (HV−).

The high-voltage battery 35 may be any suitable multi-cell high-voltage energy storage device, e.g., a multi-cell lithium ion device. The high-voltage battery 35 is fabricated using a plurality of battery cells 31, and includes a first cell module 32 and a second cell module 34 that are electrically separated by a high-voltage electrical interrupt link 33. In one embodiment, the plurality of battery cells 31 including the first cell module 32 and the second cell module 34 are arranged in series. Alternatively, the first cell module 32 and the second cell module 34 may be arranged in parallel. Alternatively, the plurality of battery cells, the first cell module 32 and the second cell module 34 may be arranged in any suitable electrical arrangement that includes a combination of parallel and/or series connections. In one embodiment, the first battery cell module 32 includes a quantity of the battery cells 31 that is equivalent to the quantity of the cells 31 in the second battery cell module 34, and a total quantity of the cells in the high-voltage battery 35 may equal a sum of the cells 31 in the first and second battery cell modules 32, 34. Thus, the voltage potential across the first battery cell module 32 is equal to the voltage potential across the second battery cell module 34. The first battery cell module 32 electrically connects to the first subsystem 42 to supply electric power thereto, and the second battery cell module 34 electrically connects to the second subsystem 44 to supply electric power thereto. Electric power from the high-voltage battery 35 may be monitored by a current sensor 52 and a voltage sensor 54. Alternatively, electric power inputs to both the first and second subsystems 42 and 44 may be monitored employing suitable current sensors and voltage sensors.

The engine 22 may be any suitable internal combustion engine that converts hydrocarbon-based or other fuel to mechanical power through combustion processes. The engine 22 may mechanically rotatably couple to the geartrain 24 or another suitable mechanical coupling. The mechanical coupling of the engine 22 to the electric machine 26 is such that the electric machine 26 may spin the engine 22 as part of an engine starting procedure. As such, the engine 22 described herein may not be configured with a low-voltage electric starter system in one embodiment.

The electric machine 26 may be any electric machine including a rotor and stator that converts high-voltage electric power to mechanical power and preferably converts mechanical power to electric energy that may be stored in the high-voltage battery 35, and in one embodiment is a high-voltage multi-phase motor/generator device that electrically connects to a traction power inverter module (TPIM) 28. The TPIM 28 electrically connects to the HV bus 50 between HV+ and HV−. The TPIM 28 is configured with suitable control circuits including power transistors, e.g., IGBTs, which transform high-voltage DC electric power to high-voltage AC electric power and transform high-voltage AC electric power to high-voltage DC electric power. In one embodiment, the TPIM 28 employs pulsewidth-modulating (PWM) control to convert stored DC electric power originating in the high-voltage battery 35 to AC electric power to drive the electric machine 26 to generate torque. Similarly, the TPIM 28 converts mechanical power transferred to the electric machine 26 to DC electric power to generate electric energy that is storable in the high-voltage battery 35, including as part of a regenerative power control strategy. The TPIM 28 is configured to receive motor control commands and control inverter states to provide motor drive and regenerative braking operations.

The powertrain system 20 may employ a second or more electric machines for vehicle propulsion and other functions. The geartrain 24 may include any suitable mechanical power transfer mechanisms, such as planetary gears, helical gears and other gearsets, rotating shafts, clutches, brakes and other devices without limitation. Details of mechanical interconnections between the engine 22, the electric machine 26 and the geartrain 24 are known and not described in detail.

The controller 90 preferably includes a plurality of discrete devices that are co-located with the individual elements of the powertrain system 20 to effect operational control of the individual elements of the powertrain system 20 in response to operator commands and powertrain demands. A user interface includes a controller or related device that signally connects to a plurality of human/machine interface devices through which an operator commands operation of the vehicle 100, and may include an ignition key or a vehicle start button for initiating and ending vehicle and powertrain operation, an accelerator pedal, a brake pedal, a transmission range selector (PRNDL) and an ignition switch to enable an operator to crank and start the engine 22. The controller 90 may also include a control device that provides hierarchical control of other control devices. The controller 90 communicates with each of the high-voltage battery 35, the low-voltage electric power system 40, and the TPIM 28 either directly or via a communications bus 16 to monitor and control operation thereof. The controller 90 commands operation of the powertrain system 20, including selecting and commanding operation in one of a plurality of operating modes to generate and transfer torque between the torque generative devices, e.g., the engine 22, the electric machine 26 and the driveline 60.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be periodically executed at regular intervals during ongoing operation. Alternatively, routines may be executed in response to occurrence of a triggering event. Communication includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communication signals between controllers. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Figure 2:
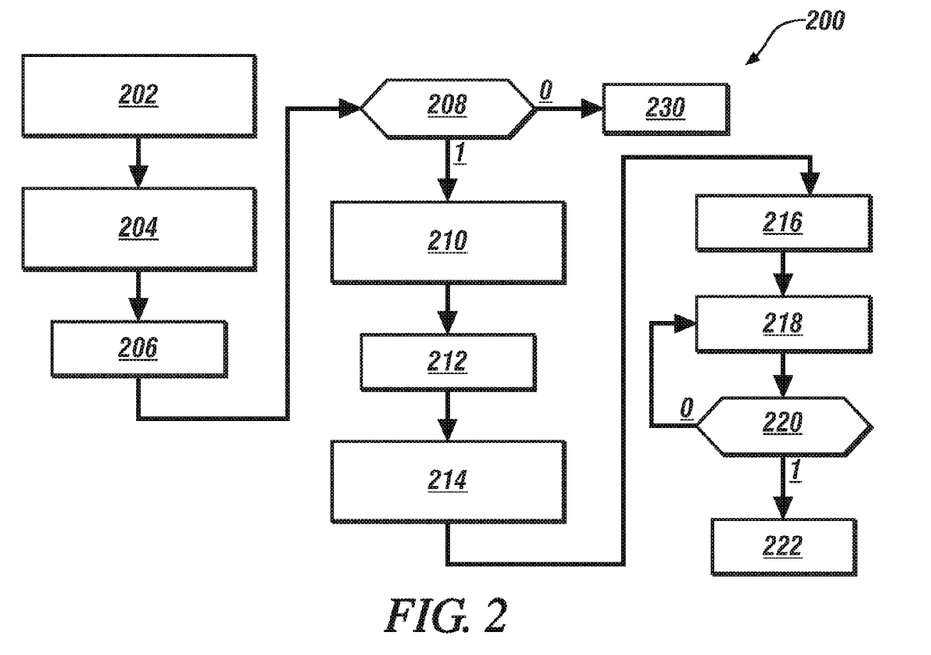
FIG. 2 schematically illustrates an embodiment of a critical vehicle operation sustaining routine that may be executed to control operation of the vehicle described with reference to FIG. 1 to supply electric power originating from a high-voltage battery to a subsystem that includes one or more low-voltage systems associated with critical vehicle operation when a fault occurs in the high-voltage battery, in accordance with the disclosure.

FIG. 2 schematically illustrates a first embodiment of a critical vehicle operation sustaining routine (routine) 200 that may be executed by the controller 90 to control operation of the vehicle 100 including the powertrain system 20 described with reference to FIG. 1 to supply electric power originating from the high-voltage battery 35 to one or more low-voltage systems associated with critical vehicle operation when a fault occurs in the high-voltage battery 35. The low-voltage systems associated with critical vehicle operation include, e.g., low-voltage systems 82, 84, 86. This routine 200 may be advantageously employed on vehicle systems that employ high-voltage electrical systems without a backup low-voltage battery. Table 1 is provided as a key wherein the numerically labeled blocks and the corresponding functions are set forth as follows, corresponding to the routine 200.

TABLE 1

| BLOCK | BLOCK CONTENTS |
|---|---|
| 202 | Monitor electric current from the first battery cell module and the second battery cell module of the high-voltage battery |
| 204 | Balance battery output power through the first and second DC/DC converter subsystems |
| 206 | Monitor high-voltage battery |
| 208 | High-voltage battery fault detected? |
| 210 | Disable DC/DC converter connected to battery cell module associated with fault |
| 212 | Shed non-critical electric power loads |
| 214 | Maintain critical electric power loads |

TABLE 1-continued

| BLOCK | BLOCK CONTENTS |
|---|---|
| 216 | Notify vehicle operator |
| 218 | Monitor SOC of high-voltage battery |
| 220 | Is SOC less than minimum threshold? |
| 222 | Shut down battery |
| 230 | End this iteration |

The routine 200 preferably periodically executes during ongoing vehicle operation. This includes monitoring electric current from the first battery cell module 32 and the second battery cell module 34 of the high-voltage battery 30 (202) and balancing battery output power through the first and second DC/DC converter subsystems 42, 44 to ensure all the cells 31 of the high-voltage battery 30 discharge at a common rate (204). Processes for balancing battery output power are known to those skilled in the art, and are not described in detail herein. The high-voltage battery 30 is monitored (206), with the monitoring including monitoring states of parameters related to temperature, current, voltage and/or other parameters that may indicate occurrence of a fault in either the first or second battery cell modules 32, 34. Such faults may include either an open circuit, a short circuit, or another fault. Methods and systems for detecting faults in batteries is known to those skilled in the art and thus not described herein. When no fault in the high-voltage battery is detected (208)(0), this iteration of the routine 200 ends (230).

When a fault in the high-voltage battery is detected (208)(1), the routine 200 determines whether the fault has occurred in the first battery cell module 32 or the second battery cell module 34, and disables the corresponding one of the first and second DC/DC converter subsystems 42, 44 that is connected thereto (210). Low-voltage electric power loads associated with non-critical vehicle operations are disconnected, disabled or otherwise rendered non-functional so they no longer draw electric loads (212). The low-voltage systems 88 include devices such as electric windows, HVAC fans, seats, and other accessory devices that generate low-voltage electric power loads. Low-voltage electric power loads associated with critical vehicle operations are supplied electric power through the functioning one of the first and second DC/DC converter subsystems 42, 44 (214). Vehicle operation continues, and the vehicle operator is notified via a dashboard lamp or other warning system of the occurrence of the fault (216). The high-voltage battery 30 is continually monitored, including its state-of-charge (SOC) (218), and when the high-voltage battery 30 discharges to a minimum SOC threshold (220)(1), the high-voltage battery 30 is shut down (222), as is the vehicle 100. Thus, the critical vehicle operations are uninterrupted and sustained while the vehicle 100 is operational even in presence of a fault in the high-voltage battery 30 on a system that does not employ a low-voltage battery.

Figure 3:
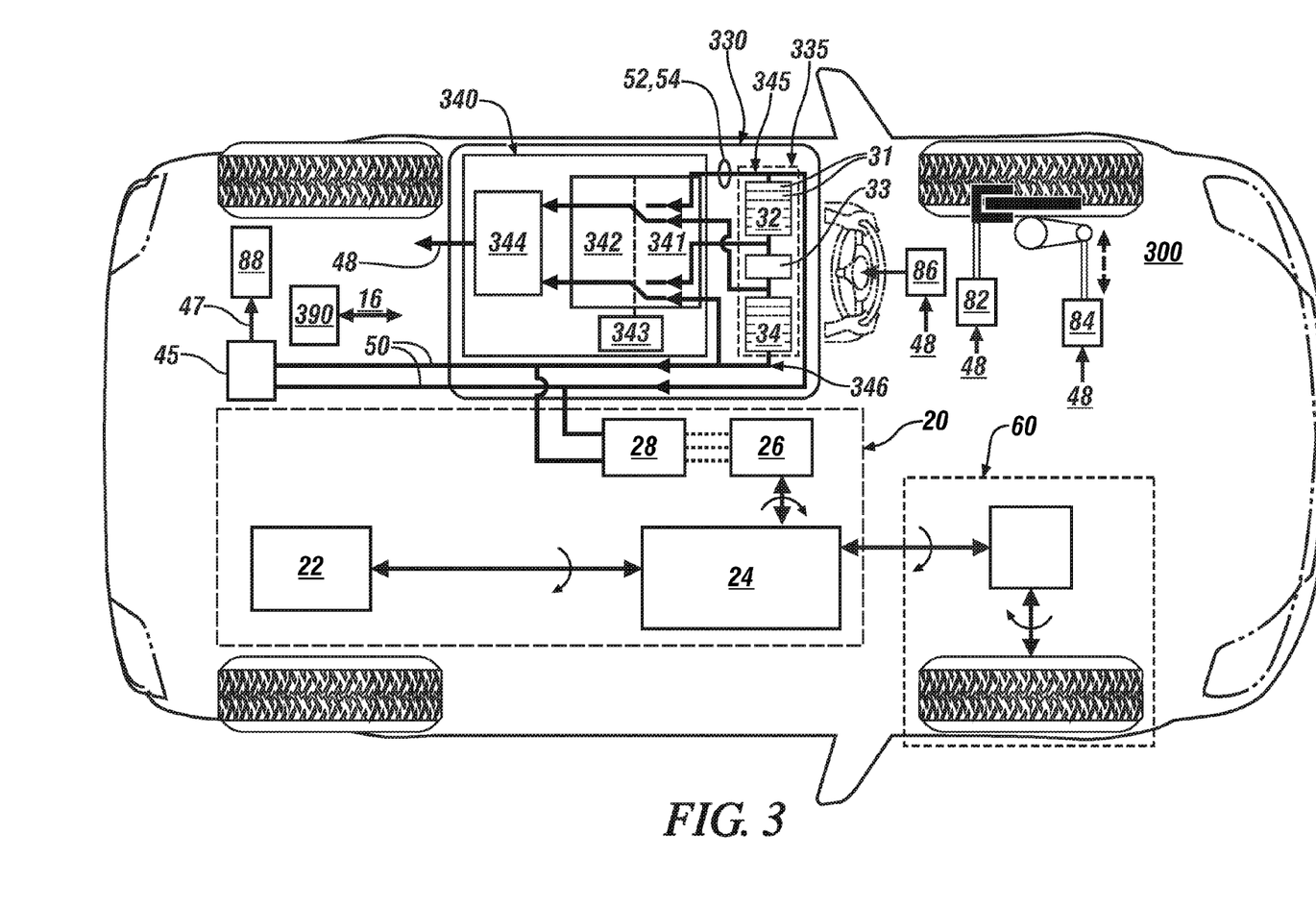
FIG. 3 schematically illustrates another embodiment of a vehicle including a powertrain system and a high-voltage electric power system, in accordance with the disclosure.

FIG. 3 schematically illustrates an embodiment of a vehicle 300 including a powertrain system 20 and a high-voltage electric power system 330 that is controlled by a controller 390. The powertrain system 20 including the engine 22, TPIM 28, electric machine 26, geartrain 24 and driveline 60 has been described with reference to FIG. 1. The high-voltage electric power system 330 includes the high-voltage battery 335 and a low-voltage electric power system 340. The high-voltage battery 335 supplies high-voltage electric power via the high-voltage bus 50 to the electric power components, e.g., the TPIM 28. The low-voltage electric power system 340 electrically connects to the high-voltage battery 335 and includes a power selector subsystem that supplies high-voltage electric power to a DC/DC converter 344 that preferably includes electronic circuits that convert DC electric power from a higher voltage level to a lower, regulated voltage level, with operation of the power selector subsystem controlled by a logic controller 343. The DC/DC converter 344 supplies electric power to the first low-voltage power conductor 48. One or more low-voltage systems 88 associated with non-critical vehicle operations, including devices such as electric windows, HVAC fans, seats, and other accessory devices electrically connect via the second low-voltage power conductor 47 to another low-voltage power supply, e.g., a DC/DC electric power converter 45 that electrically connects to the HV bus 50 and generates the second low-voltage power conductor 47.

The power selector subsystem 342 includes control switches 341 that may be selectively controlled by the logic controller 343 to select electric power to flow to the DC/DC converter 344 through a first electric circuit 345 to conductors 342 that electrically connect to the DC/DC converter 344, wherein the first electric circuit 345 includes the first battery cell module 32 of the high-voltage battery 335. The control switches 341 may instead be selectively controlled by the logic controller 343 to select electric power to flow through a second electric circuit 346 to the conductors 342 that electrically connect to the DC/DC converter 344, wherein the second electric circuit 346 includes the second battery cell module 32 of the high-voltage battery 335. As shown and arranged, the voltage potential across the first battery cell module 32 is equal to the voltage potential across the second battery cell module 34. The logic controller 343 employs information from monitoring of the current flow and voltage of the high-voltage battery 335 to balance battery output power from the first and second battery cell modules 32, 34. The regulated voltage level output from DC/DC converter 344 is 14.4 V-DC, which is nominally a low-voltage system. The controller 390 commands operation of the powertrain system 20, including selecting and commanding operation in one of a plurality of operating modes to generate and transfer torque between the torque generative devices, e.g., the engine 22 and the electric machine 26 and the driveline 60.

Figure 4:
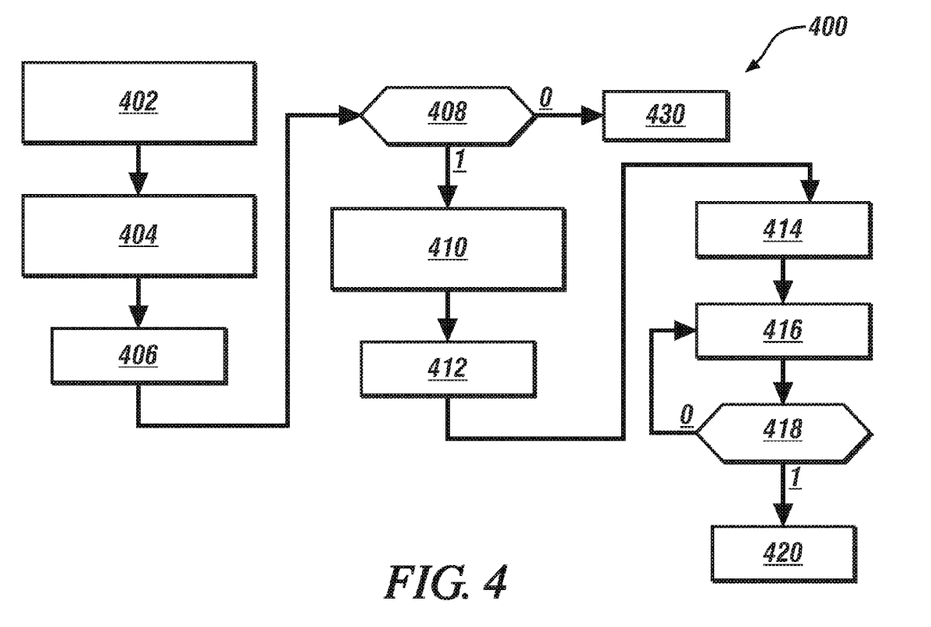
FIG. 4 schematically illustrates an embodiment of a critical vehicle operation sustaining routine that may be executed to control operation of the vehicle described with reference to FIG. 3 to supply electric power originating from a high-voltage battery to a subsystem that includes one or more low-voltage systems associated with critical vehicle operation when a fault occurs in the high-voltage battery, in accordance with the disclosure.

FIG. 4 schematically illustrates another embodiment of a critical vehicle operation sustaining routine (routine) 400 that may be executed by the controller 390 to control operation of the vehicle 300 including the powertrain system 20 described with reference to FIG. 3 to supply electric power originating from the high-voltage battery 335 to the first low-voltage power conductor 48, e.g., low-voltage systems 82, 84, 86 when a fault occurs in the high-voltage battery 335. This routine 400 may be advantageously employed on vehicle systems that employ high-voltage electrical systems without a backup low-voltage battery. Table 2 is provided as a key wherein the numerically labeled blocks and the corresponding functions are set forth as follows, corresponding to the routine 400.

TABLE 2

| BLOCK | BLOCK CONTENTS |
| --- | --- |
| 402 | Monitor electric current from the first battery cell module and the second battery cell module of the high-voltage battery |
| 404 | Cycle battery output power to balance SOC in the first battery cell module and the second battery cell module of the high-voltage battery |
| 406 | Monitor high-voltage battery |
| 408 | High-voltage battery fault detected? |
| 410 | Discontinue cycling battery output to battery cell module associated with fault |
| 412 | Shed non-critical electric power loads Maintain critical electric power loads |
| 414 | Notify vehicle operator |
| 416 | Monitor SOC of high-voltage battery |
| 418 | Is SOC less than minimum threshold? |
| 420 | Shut down battery |
| 430 | End this iteration |

The routine 400 preferably periodically executes during ongoing vehicle operation. This includes monitoring electric current from the first battery cell module 32 and the second battery cell module 34 of the high-voltage battery 335 (402) and cycling battery output power between the first and second battery cell modules 32, 34 to ensure they discharge at a common rate (404). Processes to cycle battery output power between the first and second battery cell modules 32, 34 to ensure they discharge at a common rate are known to those skilled in the art. The high-voltage battery 335 is monitored (406), with the monitoring including monitoring states of parameters related to temperature, current, voltage and/or other parameters that may indicate occurrence of a fault in either the first or second battery cell modules 32, 34. Such faults may include either an open circuit, a short circuit, or another fault. Fault detection in batteries is known to those skilled in the art and thus not described herein. When no fault in the high-voltage battery 335 is detected (408)(0), this iteration of the routine 400 ends (430).

When a fault in the high-voltage battery is detected (408)(1), the routine 400 determines whether the fault has occurred in the first battery cell module 32 or the second battery cell module 34, and disables cycling to that battery cell module (410). Low-voltage electric power loads associated with non-critical vehicle operations are disconnected, disabled or otherwise rendered non-functional so they no longer draw electric loads. The low-voltage electric power loads include the low-voltage systems 88 including devices such as electric windows, HVAC fans, seats, and other accessory devices. Low-voltage electric power loads associated with critical vehicle operations are supplied electric power through the functioning one first and second battery cell modules 32, 34 (412). Vehicle operation continues, and the vehicle operator is notified via a dashboard lamp or other warning system of the occurrence of the fault (414). The high-voltage battery 335 is continually monitored, including monitoring state-of-charge (SOC)(416), and when the high-voltage battery 335 discharges to a minimum SOC threshold (418)(1), the high-voltage battery 335 is shut down (420), as is the vehicle 100. Otherwise (418)(0), vehicle operation continues. Thus, the critical vehicle operations are uninterrupted and sustained while the vehicle 100 is operational even in presence of a fault in the high-voltage battery 335 on a system that does not employ a low-voltage battery.

Figure 5:
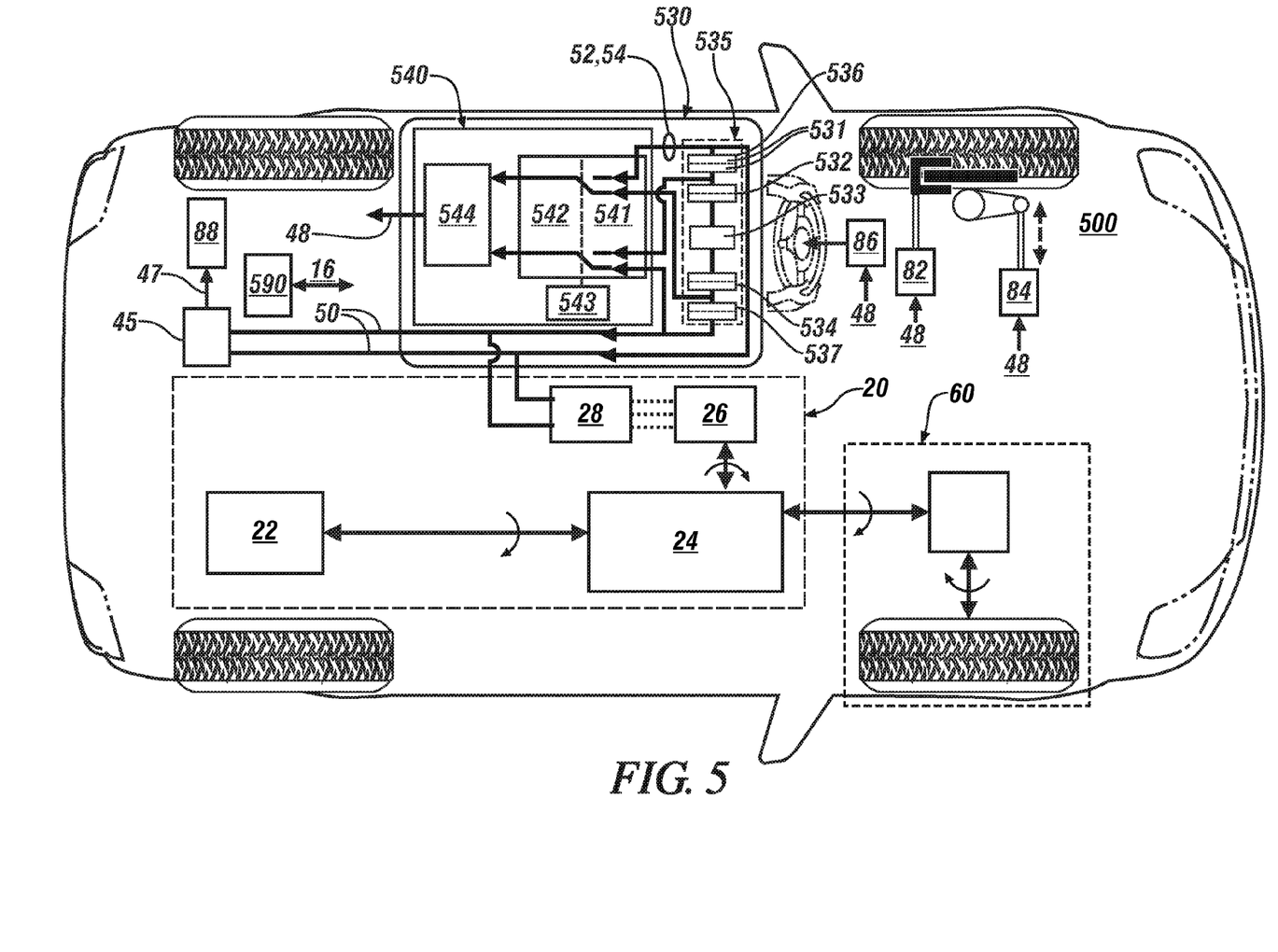
FIG. 5 schematically illustrates another embodiment of a vehicle including a powertrain system and a high-voltage electric power system, in accordance with the disclosure.

FIG. 5 schematically illustrates an embodiment of a vehicle 500 including a powertrain system 20 and a high-voltage electric power system 530 that is controlled by a controller 590. The powertrain system 20 including the engine 22, electric machine 26, TPIM 28, geartrain 24 and driveline 60 has been described with reference to FIG. 1. The high-voltage electric power system 530 includes a high-voltage battery 535 and a low-voltage electric power system 540. The low-voltage electric power system 540 may function as a backup electric power supply to supply electric power to critical vehicle operations, e.g., to the first low-voltage power conductor 48 that electrically connects to low-voltage systems 82, 84, 86. The high-voltage battery 535 supplies high-voltage electric power via the high-voltage bus 50 to electric power components, e.g., TPIM 28.

The high-voltage battery 535 may be any suitable multi-cell high-voltage energy storage device, e.g., a multi-cell lithium ion device. The high-voltage battery 535 is fabricated using a plurality of battery cells 531 arranged in series, and includes a plurality of cell modules 536, 532, 534, 537 that that are electrically separated by a high-voltage electrical interrupt link 533. Four cell modules 536, 532, 534, 537 are shown, but any suitable quantity of cell modules may be selected. Each of the cell modules 536, 532, 534, 537 supplying electric power to a high-voltage electric power to a DC/DC converter 544 preferably includes an equal quantity of the battery cells 531. Thus, the voltage potential across each of the cell modules 536, 532, 534 and 537 is equivalent.

The low-voltage electric power system 540 electrically connects to the four cell modules 536, 532, 534, 537 that are arranged to supply electric power to a power selector subsystem 542 that supplies the high-voltage electric power to a DC/DC converter 544 that preferably includes electronic circuits that convert DC electric power from a higher voltage level to a lower, regulated voltage level, with operation of the power selector subsystem 542 controlled by a logic controller 543. As shown, the four cell modules 536, 532, 534, 537 are connected in series in the high-voltage battery 535 and only one is connected to the DC/DC converter 544 at a time. In this embodiment, the power selector subsystem 542 is configured to prohibit connecting the modules 536, 532, 534 and 537 in parallel. The DC/DC converter 544 supplies electric power to the first low-voltage power conductor 48. One or more low-voltage systems 88 associated with non-critical vehicle operations, including devices such as electric windows, HVAC fans, seats, and other accessory devices electrically connect via the second low-voltage power conductor 47 to another low-voltage power supply, e.g., the DC/DC electric power converter 45 that electrically connects to the HV bus 50 and generates the second low-voltage power conductor 47. The power selector subsystem 542 electrically connects to a plurality of control switches 541 that can be controlled to select electric power to flow to the DC/DC converter 544 from selected ones of the four cell modules 536, 532, 534, 537 of the high-voltage battery 535, e.g., cell modules 536 and 537 as shown. The regulated voltage level output from the DC/DC converter 544 is 14.4 V-DC, which is nominally a low-voltage system.

Figure 6:
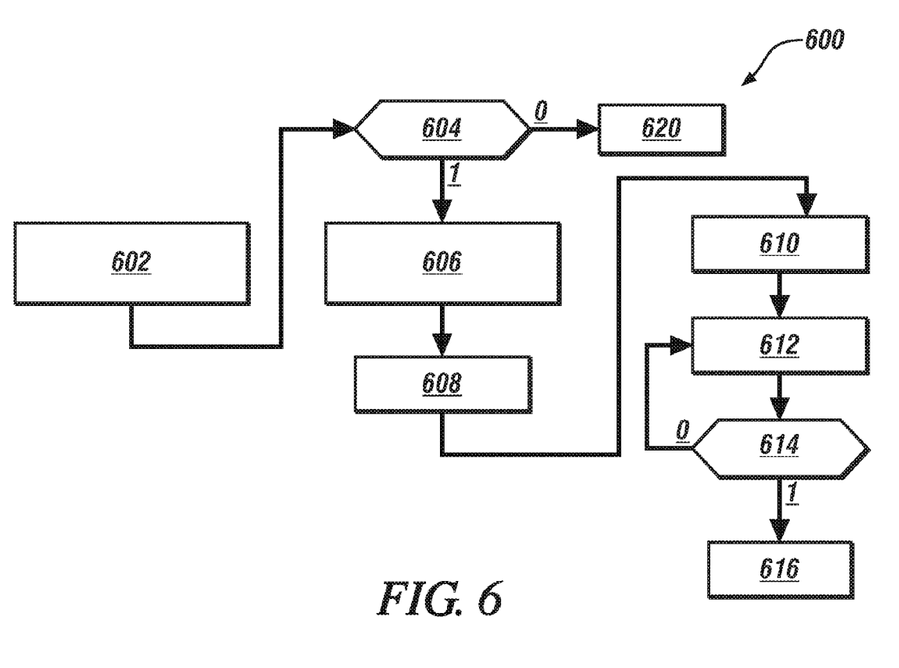
FIG. 6 schematically illustrates an embodiment of a critical vehicle operation sustaining routine that may be executed to control operation of the vehicle described with reference to FIG. 5 to supply electric power originating from a high-voltage battery to a subsystem that includes one or more low-voltage systems associated with critical vehicle operation when a fault occurs in the high-voltage battery, in accordance with the disclosure.

FIG. 6 schematically illustrates another embodiment of a critical vehicle operation sustaining routine (routine) 600 that may be executed by the controller 90 to control operation of the vehicle 500 including the powertrain system 20 described with reference to FIG. 5 to supply electric power originating from the high-voltage battery 535 to the first low-voltage power conductor 48, e.g., low-voltage systems 82, 84, 86 when a fault occurs in the high-voltage battery 535. This routine 600 may be advantageously employed on vehicle systems that employ high-voltage electrical systems without a backup low-voltage battery. Table 3 is provided as a key wherein the numerically labeled blocks and the corresponding functions are set forth as follows, corresponding to the routine 600.

TABLE 3

| BLOCK | BLOCK CONTENTS |
| --- | --- |
| 602 | Monitor battery cell modules of the high-voltage battery |
| 604 | High-voltage battery fault detected? |
| 606 | Electrically connect known operational battery cell module to DC/DC converter to maintain critical electric power loads and disallow connecting battery cell module associated with fault to DC/DC converter |
| 608 | Shed non-critical electric power loads |
| 610 | Notify vehicle operator |
| 612 | Monitor SOC of high-voltage battery |
| 614 | Is SOC less than minimum threshold? |
| 616 | Shut down battery |
| 620 | End this iteration |

The routine 600 preferably periodically executes during ongoing vehicle operation. This includes monitoring electric current from the four cell modules 536, 532, 534, 537 of the high-voltage battery 535 (602) employing any suitable monitoring routine. The monitoring preferably includes monitoring states of parameters related to temperature, current, voltage and/or other parameters that may indicate occurrence of a fault in the four cell modules 536, 532, 534, 537. Such faults may include either an open circuit, a short circuit, or another fault. Fault detection in batteries is known and thus not described herein. When no fault in the high-voltage battery 535 is detected (604)(0), this iteration of the routine 600 ends (630).

When a fault in the high-voltage battery 535 is detected (604)(1), the routine 600 determines where the fault has occurred, i.e., in which of the four cell modules 536, 532, 534, 537 of the high-voltage battery 535, and electrically connects known operational battery cell modules to the DC/DC converter 544 to supply electric power to critical electric power loads (606). Low-voltage electric power loads associated with non-critical vehicle operations are disconnected, disabled or otherwise rendered non-functional so they no longer draw electric loads (608). Vehicle operation continues, and the vehicle operator is notified via a dashboard lamp or other warning system of the occurrence of the fault (612). The high-voltage battery 535 is continually monitored, including its SOC (614), and when the high-voltage battery 535 discharges to a minimum SOC threshold (614)(1), the high-voltage battery 535 is shut down, as is the vehicle 500 (616). Thus, the critical vehicle operations are uninterrupted and sustained while the vehicle 500 is operational even in presence of a fault in the high-voltage battery 535 on a system that does not employ a low-voltage battery.

Separating the HV battery 535 into multiple components that can be individually monitored and used to independently provide power to the critical vehicle operations eliminates any single component failure within the HV battery from disabling the critical vehicle operations, and eliminates or reduces a need for a back-up battery device, with its attendant added complexity to the vehicle.

Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may all generally be referred to herein as a "module" or "system." Furthermore, the present disclosure may take the form of a computer program product embodied in any tangible medium of expression having computer-usable program code embodied in the medium.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A vehicle, comprising:
a high-voltage battery assembly including a first battery cell module and a second battery cell module, wherein the first battery cell module and the second battery cell module each includes a plurality of electrically connected cells;
a DC/DC electric power converter assembly, including a first end receiving electric power from the high-voltage battery assembly and a second end supplying low-voltage electric power at a regulated voltage level, wherein the DC/DC electric power converter assembly is configured to selectively convert electric power from the first battery cell module and selectively convert electric power from the second battery cell module, and wherein the second end is electrically connected to a low-voltage electric power system;
wherein the low-voltage electric power system includes a first subsystem configured to provide low-voltage electric power to a critical vehicle operation; and
a controller, in communication with the high-voltage battery assembly, the DC/DC electric power converter assembly and the first subsystem, wherein the controller includes algorithmic code executable to:
monitor the high-voltage battery assembly,
upon detecting a fault in the first battery cell module:
control the DC/DC electric power converter assembly to electrically convert electric power from the second battery cell module of the high-voltage battery assembly to low-voltage electric power, and
control transfer of the low-voltage electric power to the first subsystem.

2. The vehicle of claim 1, wherein the low-voltage electric power system includes a second subsystem configured to provide electric power to a non-critical vehicle operation; and wherein the controller includes algorithmic code executable to deactivate the second subsystem upon detecting the fault in the first battery cell module of the high-voltage battery assembly.

3. The vehicle of claim 2, wherein the first subsystem includes a first DC/DC converter electrically connected to the first battery cell module of the high-voltage battery assembly, and wherein the second subsystem includes a second DC/DC converter electrically connected to the second, separate battery cell module of the high-voltage battery assembly.

4. The vehicle of claim 3, wherein the controller includes algorithmic code executable to control the second DC/DC converter to electrically convert electric power from the second battery cell module to low-voltage electric power upon detecting the fault in the first battery cell module.

5. The vehicle of claim 2, wherein the low-voltage electric power system includes a single DC/DC converter and a power selector subsystem, the power selector subsystem including selectively controllable control switches that may select electric power to flow from one of the first battery cell module through a first electric circuit to the single DC/DC converter or the second battery cell module through a second electric circuit to the single DC/DC converter to provide low-voltage electric power to the critical vehicle operation.

6. The vehicle of claim 5, wherein a quantity of cells in the first battery cell module equals a quantity of cells in the second, separate battery cell module of the high-voltage battery assembly, and wherein the quantity of cells in the first battery cell module and the quantity of cells in the second battery cell module is equal to a total quantity of cells in the high-voltage battery assembly.

7. The vehicle of claim 5, wherein a quantity of cells in the first battery cell module equals a quantity of cells in the second, separate battery cell module of the high-voltage battery assembly, and wherein the quantity of cells in the first battery cell module and the quantity of cells in the second battery cell module is less than a total quantity of cells in the high-voltage battery assembly.

8. The vehicle of claim 1, wherein the controller includes algorithmic code executable to electrically disconnect the first battery cell module from the DC/DC converter upon detecting the fault in the first battery cell module of the high-voltage battery assembly.

9. The vehicle of claim 1, further comprising a powertrain system including a high-voltage electric machine electrically connected to the high-voltage battery assembly.

10. The vehicle of claim 1, wherein the first subsystem configured to provide a critical vehicle operation comprises one of an electric braking system, an electric power steering system, and a supplemental restraint system.

11. The vehicle of claim 1, wherein the high-voltage battery assembly includes a plurality of battery cells electrically connected in series.

12. The vehicle of claim 1, wherein the high-voltage battery assembly includes a plurality of battery cells electrically connected in parallel.

13. A vehicle, comprising:
a powertrain system including a high-voltage electric machine;
a high-voltage electric battery assembly including a plurality of cells electrically connected in series;
a DC/DC electric power converter, including a first end receiving electric power from the high-voltage electric battery assembly and a second end delivering low-voltage electric power at a regulated voltage level;

wherein the first end is selectively electrically connectable to a first battery cell module of the high-voltage electric battery assembly or selectively electrically connectable to a second, separate battery cell module of the high-voltage electric battery assembly and wherein the second end is electrically connected to a low-voltage system;

the low-voltage system including a first subsystem configured to provide a critical vehicle operation and a second subsystem configured to provide a non-critical vehicle operation; and a controller, in communication with the high-voltage electric battery assembly, the DC/DC converter, the first subsystem and the second subsystem, the controller including algorithmic code executable to:

monitor the high-voltage battery assembly, and upon detecting a fault in the first battery cell module of the high-voltage battery assembly:

deactivate the second subsystem configured to provide a non-critical vehicle operation, shed non-critical loads, and electrically connect the second battery cell module to the DC/DC converter.

14. A method for controlling a high-voltage battery assembly electrically connectable to a DC/DC electric power converter assembly electrically connected to a low-voltage electric power system including a first subsystem configured to provide low-voltage electric power to a critical vehicle operation, the method comprising:

arranging the high-voltage battery assembly with a first battery cell module and a second battery cell module, wherein the first battery cell module and the second battery cell module includes a plurality of electrically connected cells;

arranging the DC/DC electric power converter assembly to include a first end receiving electric power from the high-voltage battery assembly and a second end supplying low-voltage electric power to the low-voltage electric power system at a regulated voltage level, wherein the DC/DC electric power converter assembly is configured to selectively convert electric power from the first battery cell module and selectively convert electric power from the second battery cell module;

monitoring the high-voltage battery assembly;

controlling the DC/DC electric power converter assembly to electrically convert electric power from the second battery cell module of the high-voltage battery assembly to low-voltage electric power upon detecting a fault in the first battery cell module; and controlling transfer of the low-voltage electric power to the first subsystem.

15. The method of claim 14, wherein the low-voltage electric power system further comprises a second subsystem configured to provide electric power to a non-critical vehicle operation, the method further comprising deactivating the second subsystem upon detecting the fault in the first battery cell module of the high-voltage battery assembly.

16. The method of claim 15, wherein the first subsystem includes a first DC/DC converter electrically connected to the first battery cell module of the high-voltage battery assembly, and wherein the second subsystem includes a second DC/DC converter electrically connected to the second, separate battery cell module of the high-voltage battery assembly.

17. The method of claim 16, comprising controlling the second DC/DC converter to electrically convert electric power from the second battery cell module to low-voltage electric power upon detecting the fault in the first battery cell module.

18. The method of claim 14, further comprising electrically disconnecting the first battery cell module from the DC/DC converter upon detecting the fault in the first battery cell module of the high-voltage battery assembly.

* * * * *